United States Patent
Hadarik

(10) Patent No.: US 9,506,498 B2
(45) Date of Patent: Nov. 29, 2016

(54) GAP SENSING METHOD FOR FLUID FILM BEARINGS

(71) Applicant: Marc Hadarik, Higganum, CT (US)

(72) Inventor: Marc Hadarik, Higganum, CT (US)

(73) Assignee: Specialty Components, Inc., Wallingford, CT (US)

( * ) Notice: Subject to any disclaimer, the term of this patent is extended or adjusted under 35 U.S.C. 154(b) by 0 days.

(21) Appl. No.: 14/668,144

(22) Filed: Mar. 25, 2015

(65) Prior Publication Data

US 2015/0276368 A1    Oct. 1, 2015

Related U.S. Application Data

(60) Provisional application No. 61/969,925, filed on Mar. 25, 2014.

(51) Int. Cl.
| | |
|---|---|
| F16C 17/00 | (2006.01) |
| F16C 32/06 | (2006.01) |
| G01B 13/06 | (2006.01) |
| G01B 13/12 | (2006.01) |
| G01L 19/00 | (2006.01) |
| G01L 19/16 | (2006.01) |
| F16C 17/24 | (2006.01) |

(52) U.S. Cl.
CPC ............. *F16C 32/067* (2013.01); *F16C 17/24* (2013.01); *G01B 13/06* (2013.01); *G01B 13/12* (2013.01); *G01L 19/0092* (2013.01); *G01L 19/16* (2013.01); *F16C 32/0603* (2013.01); *F16C 32/064* (2013.01); *F16C 32/0614* (2013.01); *F16C 32/0629* (2013.01); *F16C 32/0644* (2013.01); *F16C 32/0648* (2013.01)

(58) Field of Classification Search
CPC ............ F16C 32/0614; F16C 32/0603; F16C 32/0629; F16C 32/064; F16C 32/0644; F16C 32/0648

USPC .......................................... 384/8, 12, 99, 100
See application file for complete search history.

(56) References Cited

U.S. PATENT DOCUMENTS

| | | | | |
|---|---|---|---|---|
| 3,724,597 A | * | 4/1973 | Bereit | ................. F16C 32/0644 184/5 |
| 3,785,707 A | * | 1/1974 | Mitsuoka | ............. F16C 32/0644 384/121 |
| 4,226,483 A | * | 10/1980 | Yamamoto | ............. F16C 29/025 384/12 |
| 4,301,687 A | | 11/1981 | Jewitt et al. | |
| 4,569,562 A | | 2/1986 | Sato et al. | |
| 4,588,288 A | * | 5/1986 | Nakasugi | ............... F16C 29/025 355/53 |
| 5,364,190 A | | 11/1994 | Ochiai et al. | |
| 5,447,375 A | | 9/1995 | Ochiai et al. | |
| 6,547,438 B2 | | 4/2003 | Shima | |
| 6,925,854 B2 | | 8/2005 | Neumann | |

(Continued)

*Primary Examiner* — Lisa Caputo
*Assistant Examiner* — Jonathan Dunlap
(74) *Attorney, Agent, or Firm* — St. Onge Steward Johnston & Reens, LLC

(57) ABSTRACT

A method for adjusting a fluid gap in fluid film bearings comprising the steps of applying a load to the bearing, measuring fluid pressure of the fluid film, determining the fluid gap using a known relationship between the bearing load applied versus gap and corresponding fluid pressure and adjusting the gap to a desired width using the known relationship between the bearing load applied versus gap and corresponding fluid pressure. Predetermined measurements of film gage pressure, supply gage pressure and gap distance can be used to determine the ratio of absolute film pressure to absolute input pressure which, in turn, can be used to determine a formula for calculating unknown gap distances.

15 Claims, 16 Drawing Sheets

(56) References Cited

U.S. PATENT DOCUMENTS 7,744,281 B2 6/2010 Fuerst et al.
2004/0206159 A1* 10/2004 Neumann ............... F16C 17/02
 73/37
2008/0304772 A1* 12/2008 Kakutani .............. F16C 29/025
 384/12
2013/0209007 A1 8/2013 Corts
2014/0317942 A1* 10/2014 Sagemueller ........ G01B 21/042
 33/503

* cited by examiner

1 X 2 INCH FLAT RECTANGULAR AIR BEARING

1 X 2 INCH FLAT RECTANGULAR AIR BEARING

2 X 4 INCH FLAT RECTANGULAR AIR BEARING

2 X 4 INCH FLAT RECTANGULAR AIR BEARING

2 X 4 INCH FLAT RECTANGULAR AIR BEARING

2 INCH DIAMETER FLAT ROUND AIR BEARING

GAP SENSING METHOD FOR FLUID FILM BEARINGS

FIELD OF THE INVENTION

The present invention relates to a method of measuring and adjusting the gap of a fluid film bearing during assembly and after operation using sensed pressure of the fluid film.

BACKGROUND OF THE INVENTION

Fluid film bearings have found many useful places in industry for their nearly frictionless, zero wear and high accuracy characteristics. These bearings utilize a pressurized gas or liquid to separate two surfaces and provide relative motion. Due to the low viscosity of the fluids employed, the shear forces required to allow motion remain very small. In cases where a gas becomes the operating fluid, the shear forces, especially for static friction, can become nearly immeasurable. This minimal friction translates into practically no wear or surface erosion of the mating parts. In addition, this non-contacting nature averages local irregularities of the mating surfaces, hence improving straightness or roundness of motion. This is a great benefit to devices that require motion with high repeatability and accuracy such as semiconductor wafer scanning tools, coordinate measuring machines or high-speed pick and place machinery.

In order for this type of bearing to function properly, the gap separating the two or more elements needs to be very small to avoid instability of the fluid film. Most applications of fluid bearings have separation gaps ranging from less than one micron to 40 microns; with the average lying in the 5-10 micron range. This makes proper installation cumbersome, especially in the production environment or out in the field, due to the difficulty in measuring such small distances. To provide installation, some machine designers will involve the use of an adjustment screw or flexure to set the preload of the bearing. After the bearing is placed into the assembly, a threaded ball stem applies the load in the center of the bearing. The technician then adjusts the screw until the proper gap is measured. Even with fine pitch screws, it can be difficult and tedious to make adjustments in the micron range, re-measure the gap and then readjust the screw. In addition, often times it is difficult to access the bearing through the surrounding machine structure to perform a gap measurement. However, when access is available, this is typically performed by situating a suitable measuring indicator or non-contact sensor in such a way to measure movement of the bearing housing and then, in the case of an externally pressurized bearing, cycling the fluid pressure on and off while recording the relative distance the housing has translated. This method, used extensively, has a number of drawbacks related to the aforementioned access difficulty.

First, it is a measurement relatively far away from the actual film gap. The measured displacement of the bearing housing may not accurately reflect the actual width of the fluid film. Second, often measurements are only performed near the periphery of the housing and, hence, do not take into account the possibility that the bearing is lifting in a tilted state. Third, bench-top measurements often performed prior to installation are under ideal loading conditions and may not accurately reflect fluid gaps after installation. Fourth, in the field, the technician often has a reduced number of measuring capabilities at his or her disposal and may often rely on only experience or more indirect, correlated or interpolated measurements of the gap. Therefore, correct installation of the bearing is often more dependent on proper design and function of the bearing rather than on an accurate measurement of the gap.

In addition, machine tools incorporated with fluid film bearings often do not monitor the gap during operation due to the all the aforementioned technical difficulties associated with performing gap measurements. Under certain circumstances, the machine assembly may have become unknowingly stressed which may cause slight misalignment of critical features relating to the proper fluid gap. This would result in subpar performance of the machine. At this point, the technician would need to halt use of the machine, disassemble and then verify gaps of all the bearings; a costly and time consuming process.

Therefore, there exists a need to perform fluid film gap measurements more easily and accurately.

U.S. Pat. No. 6,925,854 to Neumann describes a method of verifying and inspecting the bearing gap of a hydrodynamic bearing. A measuring fluid is caused to flow through the bearing gap. This takes place prior to final assembly, and before filling lubricant into the bearing, so fluid can still flow through the bearing gap. The flow needs to be measured parallel to the longitudinal axis of the shaft and the test bearing must be open at both ends to allow the flow to be established.

Measurement of various aspects of a fluid bearing after it is already installed and operating are known. For instance, U.S. Pat. No. 7,744,281 to Fuerst et al. describes a method of monitoring temperature in a plain bearing working with a lubricating film. The method involves extracting samples of the fluid for temperature measurement. The method has several disadvantages. First, the temperature must be measured directly after extraction. Further, the amount of fluid extracted must balance the need to extract a small amount so as not to disturb the film pressure with the need extract enough fluid to keep temperature change small. Placement of a temperature sensor is also limited to a distance in which the fluid temperature will not be distorted. The method is further contingent on fluid flow of extracted samples.

Control of operating bearings through sensed pressure is also known. For example, U.S. Pat. No. 4,569,562 to Sato et al. discloses a method for powering off or switching pressure supplied to an operating bearing when pressure reaches a predetermined value exceeding a servo-controlled upper or lower limit. In this manner, the sensed data is used to dynamically hold the fluid (air) pressure within a safe range between upper and lower limits.

U.S. Pat. Nos. 5,364,190 and 5,447,375 to Ochiai et al. also teach the use of sensed temperature and pressure of fluid (oil) to constantly maintain the fluid gap of a hydrostatic bearing apparatus. The pressure and temperature of the oil are measured and used to adjust the flow rate and temperature of oil delivered to a static pressure pocket. Similarly, U.S. Pat. No. 6,547,438 to Shima discloses use of sensed temperature and pressure of a lubricant oil to control flow of the oil to the fluid gap of a hydraulic bearing device and control separation between the bearing components.

SUMMARY OF THE INVENTION

The inventive method aims to build upon, improve and simplify the prior art methods of determining gap distance and adjusting gap width in a fluid bearing. In particular, it is an object of the invention to provide a method of determining gap distance that can be utilized to adjust the gap during assembly and also after a bearing is in operation.

It is further an object of the invention to provide a method of determining gap distance that does not require taking a sample of fluid from the fluid film and that can be used in various types of fluid bearings.

The foregoing is achieved by provision of a method of measuring gap distance in fluid film bearings that comprises applying a load to the bearing housing, measuring fluid pressure of the fluid film, and determining the gap distance using a known relationship between the bearing load applied versus gap and corresponding fluid pressure.

In some embodiments, prior to applying a load to the bearing, the method comprises the step of determining a relationship between the load applied to the bearing, gap distance and fluid pressure. In some of those embodiments, the step of determining a relationship between the load applied to the bearing, gap distance and fluid pressure comprises building a table of measurements of supply gage pressure, film gage pressure and gap distance. In certain of those embodiments, the ratio, Rp, of absolute air film pressure to absolute input pressure is determined.

In certain embodiments, the step of determining a relationship between the load applied to the bearing, gap distance and fluid pressure comprises determining a formula for calculating gap distance using predetermined measurements of film gage pressure, supply gage pressure and gap distance.

In some embodiments, the fluid pressure is measured by a pressure sensor. In some of those embodiments, the pressure sensor is connected to an inlet channel within the housing of the bearing, said channel leading from a surface of the fluid gap to an outer wall of said housing. In certain of those embodiments, the pressure sensor is detached after measuring the fluid pressure. In some of those embodiments, the inlet channel is plugged after the pressure sensor is detached. In some embodiments, the inlet channel is located near the center of the bearing housing.

In certain embodiments, the pressure sensor is electronic. In some embodiments, the pressure sensor is incorporated within the bearing housing. In certain of those embodiments, the pressure sensor is connected to an inlet channel leading from the sensor to a surface of the fluid gap.

In some embodiments, the method may be used with a hydrodynamic, hydrostatic, aerodynamic, aerostatic, spherical, cylindrical, conical, orifice inlet, porous surface inlet, or porous surface aerostatic bearing.

In certain embodiments, the method is performed before final assembly of the bearing. In other embodiments, the method is performed after the bearing is in operation.

The invention also comprises a method for adjusting a fluid gap in fluid film bearings comprising the steps of applying a load to the bearing, measuring fluid pressure of the fluid film, determining the fluid gap using a known relationship between the bearing load applied versus gap and corresponding fluid pressure, and adjusting the gap to a desired width using the known relationship between the bearing load applied versus gap and corresponding fluid pressure.

The invention further comprises a method for adjusting a fluid gap in fluid film bearings comprising the steps of (a) applying a load to the bearing, (b) measuring fluid pressure of the fluid film, (c) determining the fluid gap using a known relationship between the bearing load applied versus gap and corresponding fluid pressure, (d) adjusting the gap to a desired width using the known relationship between the bearing load applied versus gap and corresponding fluid pressure and repeating steps (a)-(d) until a desired gap is reached.

Other objects of the invention and its particular features and advantages will become more apparent from consideration of the following drawings and accompanying detailed description.

BRIEF DESCRIPTION OF THE DRAWINGS

FIG. 2b is a side sectional view of the bearing of FIG. 2a.

DETAILED DESCRIPTION OF THE INVENTION

Figure 1:
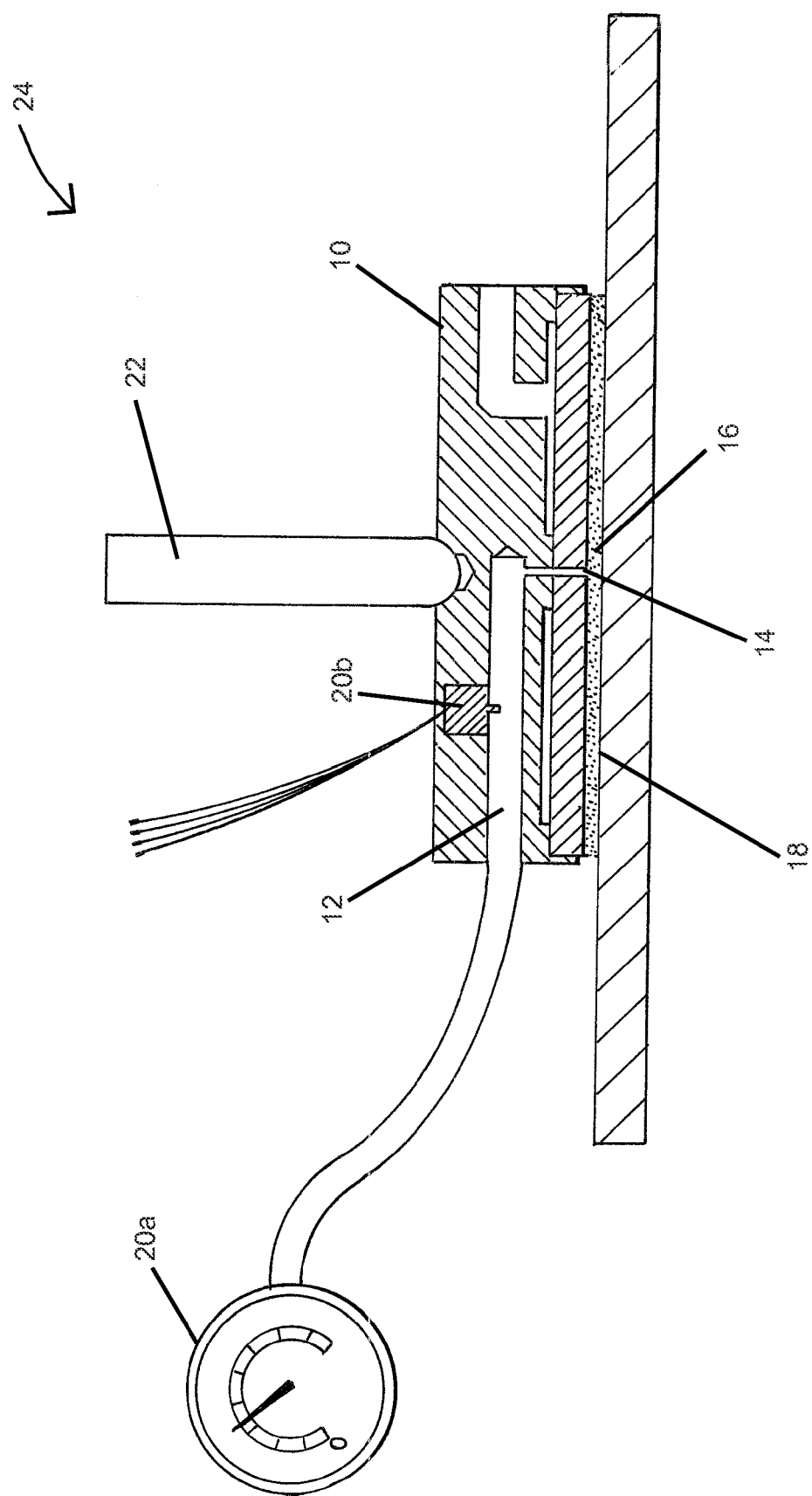
FIG. 1 is a side view of a porous surface, aerostatic, flat air bearing that may be used in the inventive methods.

Referring now to the drawings, wherein like reference numerals designate corresponding structure throughout the views.

FIG. 1 depicts a porous surface, aerostatic, flat air bearing (24) that may be used in the inventive methods. The bearing housing (10) incorporates one or more sensor inlet channels (12) which lead to one or more surfaces (14) within the fluid gap (16) while riding on the mating bearing surface (18). The sensor inlet channel (12) leads to one or more pressure sensors (20) which indicate the pressure of the fluid film (16). As the force of the applied load (22) changes, the pressure in the fluid film (16), and hence the pressure at the sensor (20), will also change determinately. The position of the inlet (12) is arbitrary, but if it is centrally located, it will provide the most average change in pressure as the load is changed.

FIG. 1 depicts a bourdon tube style gauge (20a). However, other types of pressure measurement of the fluid film can be employed to increase accuracy of the reading. For instance, FIG. 1 also incorporates an electronic pressure sensor (20b) within the housing of the bearing. The invention is not limited to any particular number or type of sensor and any of those commonly used in the art may be employed in the inventive methods.

From previously performed bench-top measurements of the load applied versus gap and corresponding film pressure, the gap (16) of the fluid can be determined, as discussed in further detail below.

Figure 2B:
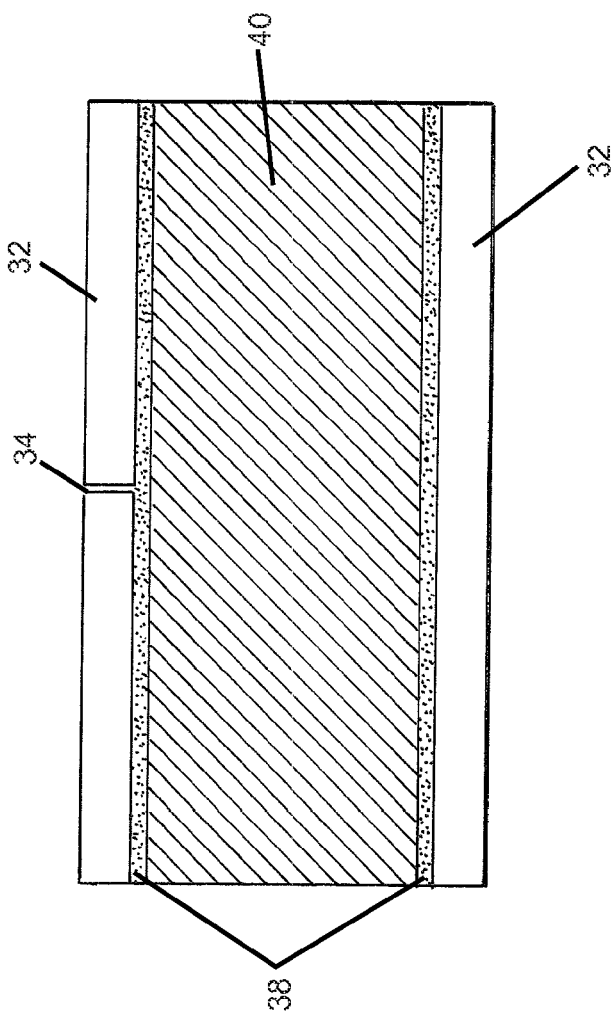
Figure 2A:
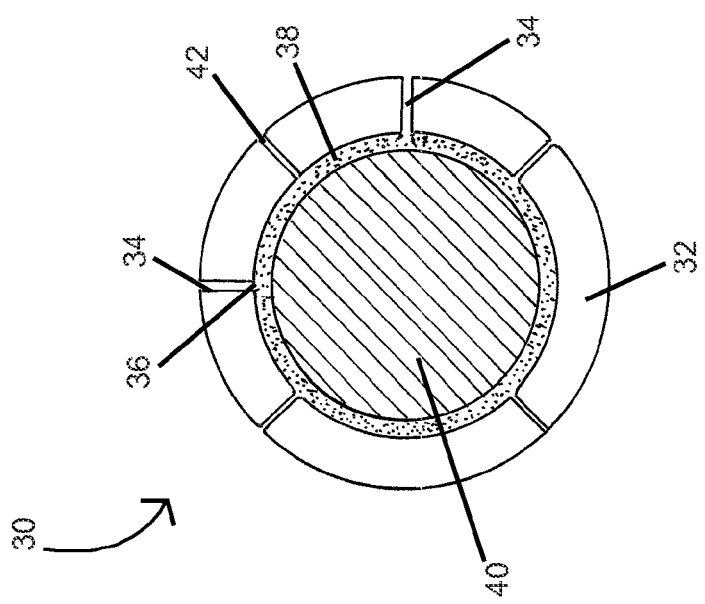
FIG. 2a is a top sectional view of a cylindrical air bearing that may be used in the inventive methods.

FIGS. 2 and 2a depict a cylindrical air bearing (30) that may be employed in the inventive methods. The bearing housing (32) incorporates one or more sensor inlet channels (34) which lead to one or more surfaces (36) within the fluid gap (38) while riding on the mating bearing surface (40). The housing (32) further incorporates pressurized inlets (42) for supplying pressurized fluid to the fluid gap (38). As with the bearing of FIG. 1, the sensor inlet channel (34) leads to a pressure sensor (not shown) which indicates the pressure of the fluid film (38). As the force of the applied load changes, the pressure in the fluid film (38) and hence the pressure at the sensor will also change determinately. The orthogonal sensing ports of the bearing of FIGS. 2 and 2a allow for determining the accessibility of the journal shaft in any direction.

Figure 3A:
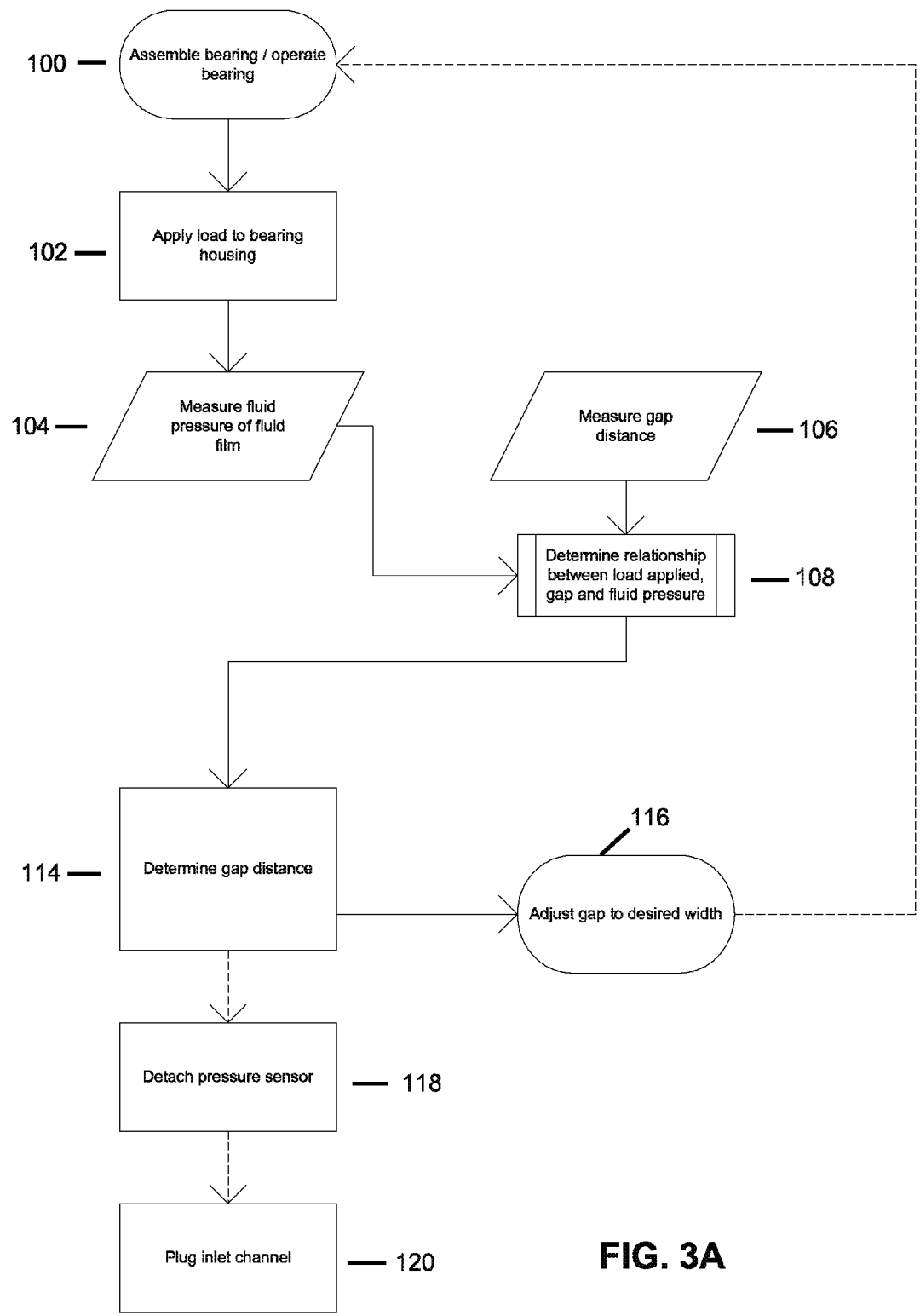
FIGS. 3A-3B are flow charts showing the inventive methods.

Generally, as shown in FIG. 3a, the inventive method is carried out by applying a known pressure load (102) to the bearing housing of an assembled bearing that may or may not have been in operation (100), measuring the sensed fluid pressure of the fluid film (104) and determining the gap distance (114) using a known relationship between the load applied, gap distance and sensed fluid pressure (114). The gap distance may then be adjusted (116) and steps (100)-(114) may be repeated until a desired gap distance is achieved. A that point, the pressure sensor may optionally be detached (118) and the inlet channel therefor may optionally be plugged (116). The bearing can be further assembled or placed back into operation.

Prior to determining an unknown gap distance (114), the relationship between the load applied, the gap distance and film fluid pressure can be determined (108) by conducting a series of measurements of each parameter (102, 106, 104) and determining a relationship between these parameters. The relationship determined at step (108) can then be used in the determining step (114), and the relationship determined at step (108) should remain fairly constant for each particular bearing/fluid configuration.

Figure 3B:
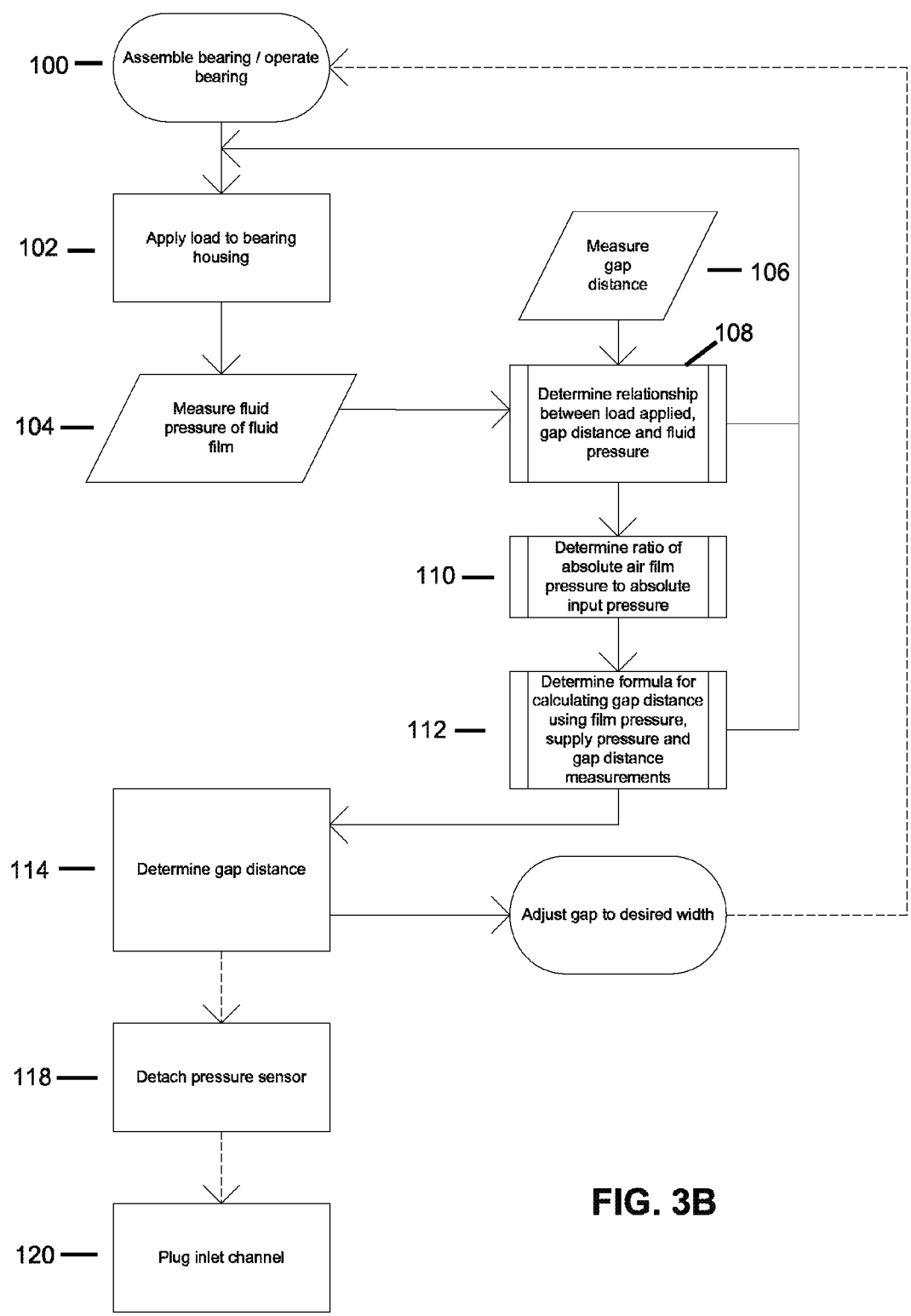
Figure 4:
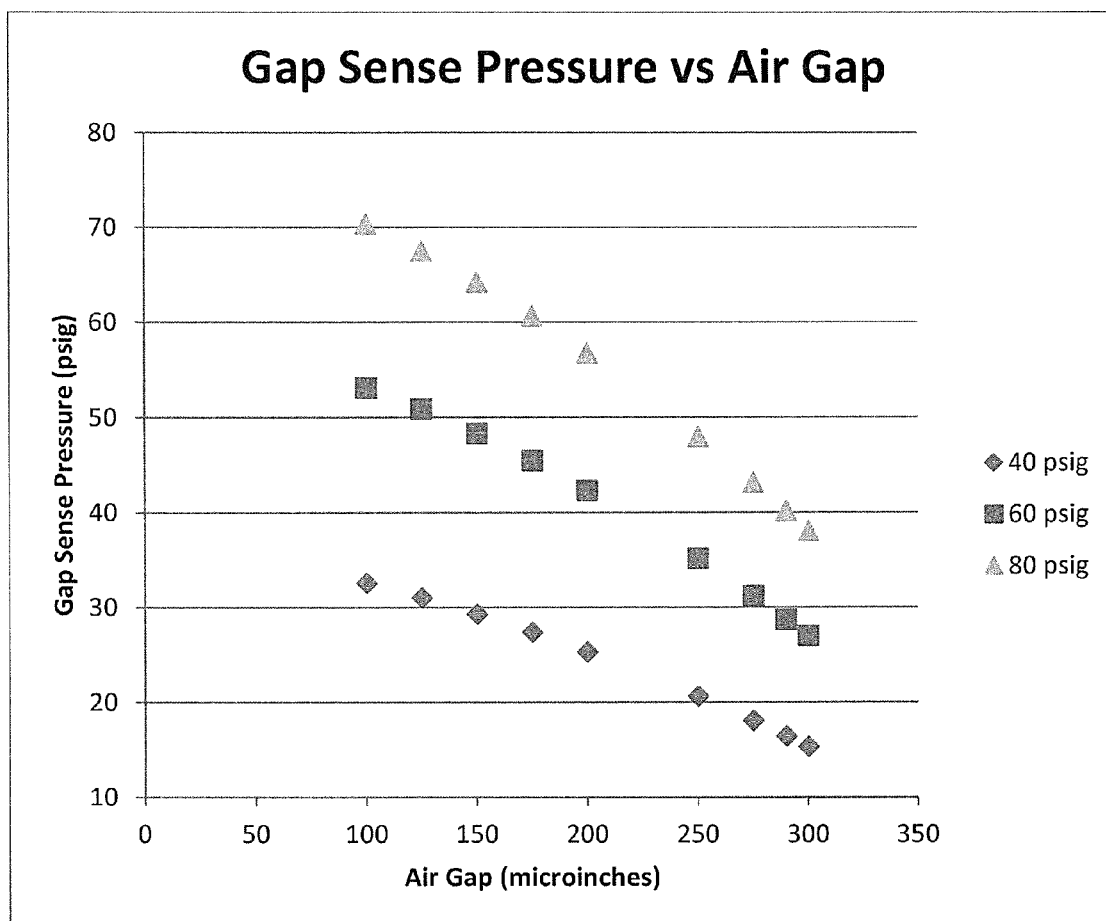
FIG. 4 is a graph showing a known relationship between gap sense pressure (psig) and gap width (microinches) for various applied pressures (psig) on a 1×2 inch flat rectangular air bearing that may be used in the inventive methods.
Figure 5:
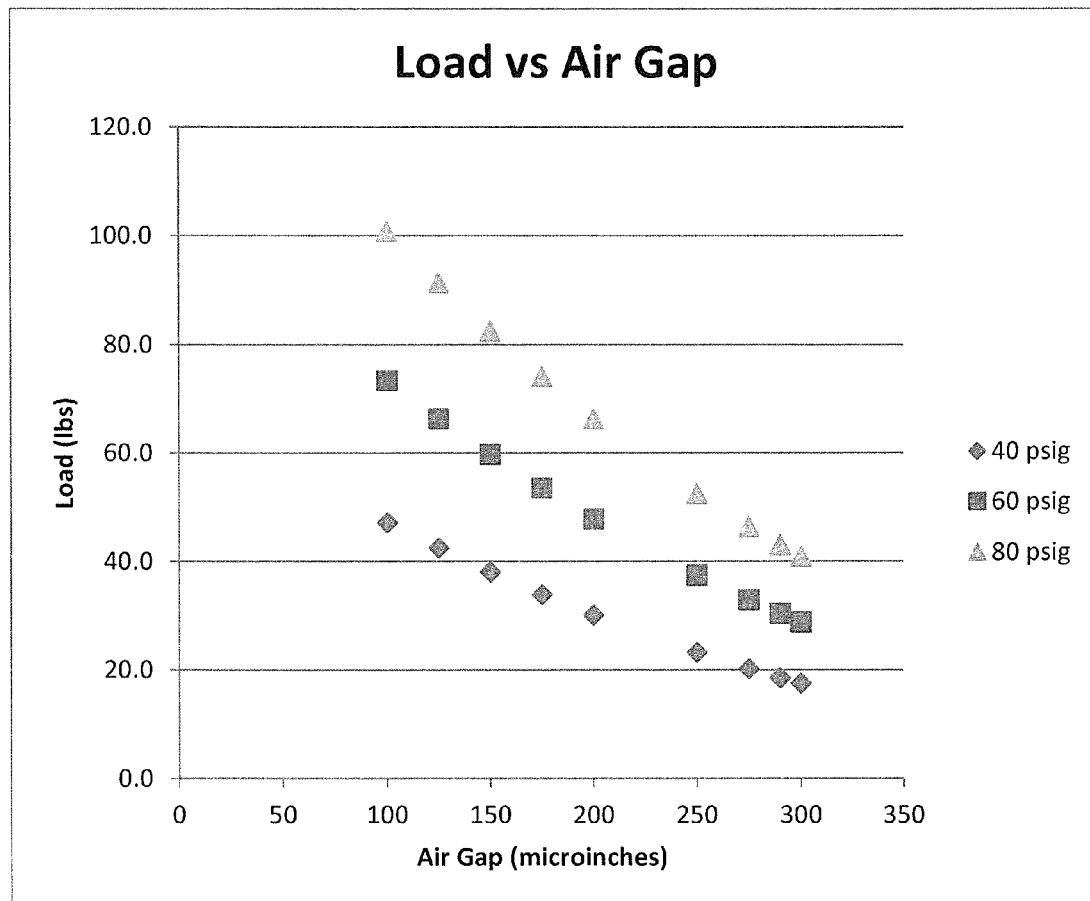
FIG. 5 is a graph showing a known relationship between load applied (pounds) and gap width (microinches) for various applied pressures (psig) on a 1×2 inch flat rectangular air bearing that may be used in the inventive methods.
Figure 6:
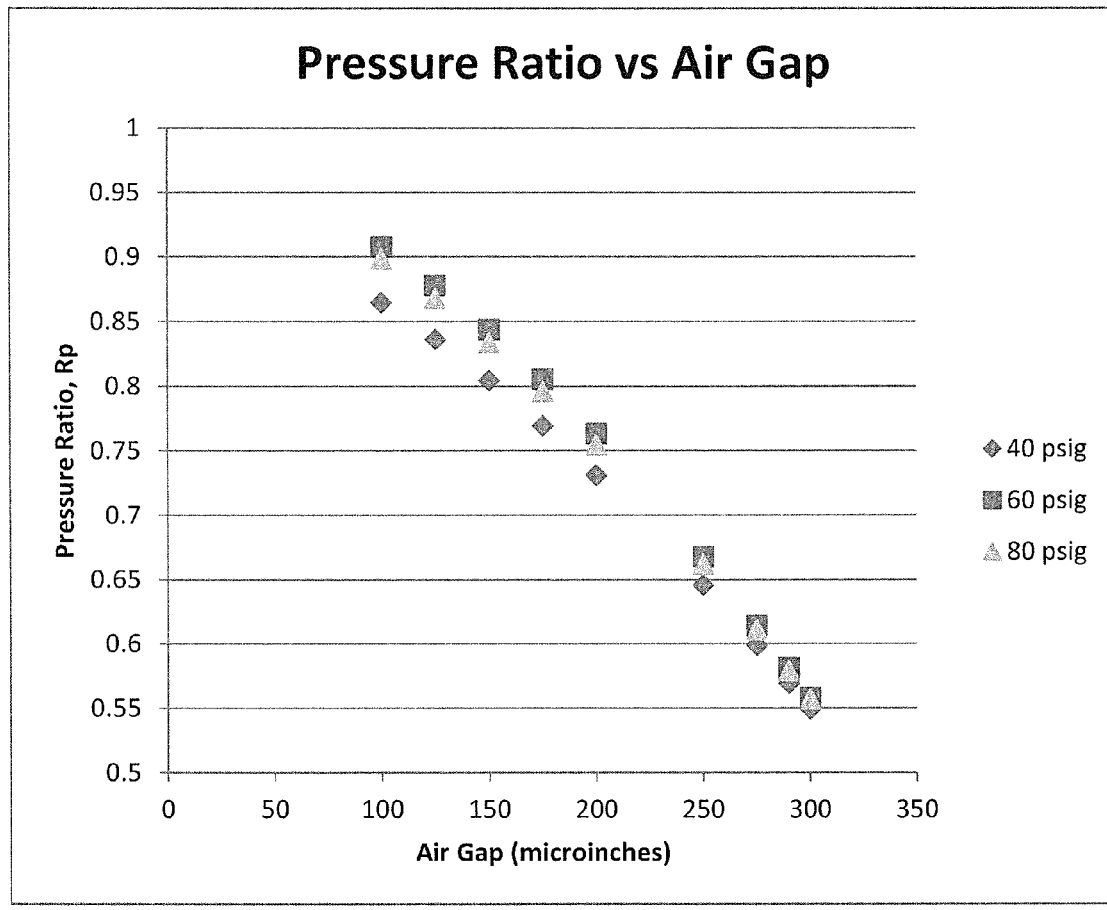
FIG. 6 is a graph showing a known relationship between pressure ratio (Rp) and gap width (microinches) for various applied pressures (psig) on a 1×2 inch flat rectangular air bearing that may be used in the inventive methods.
Figure 7:
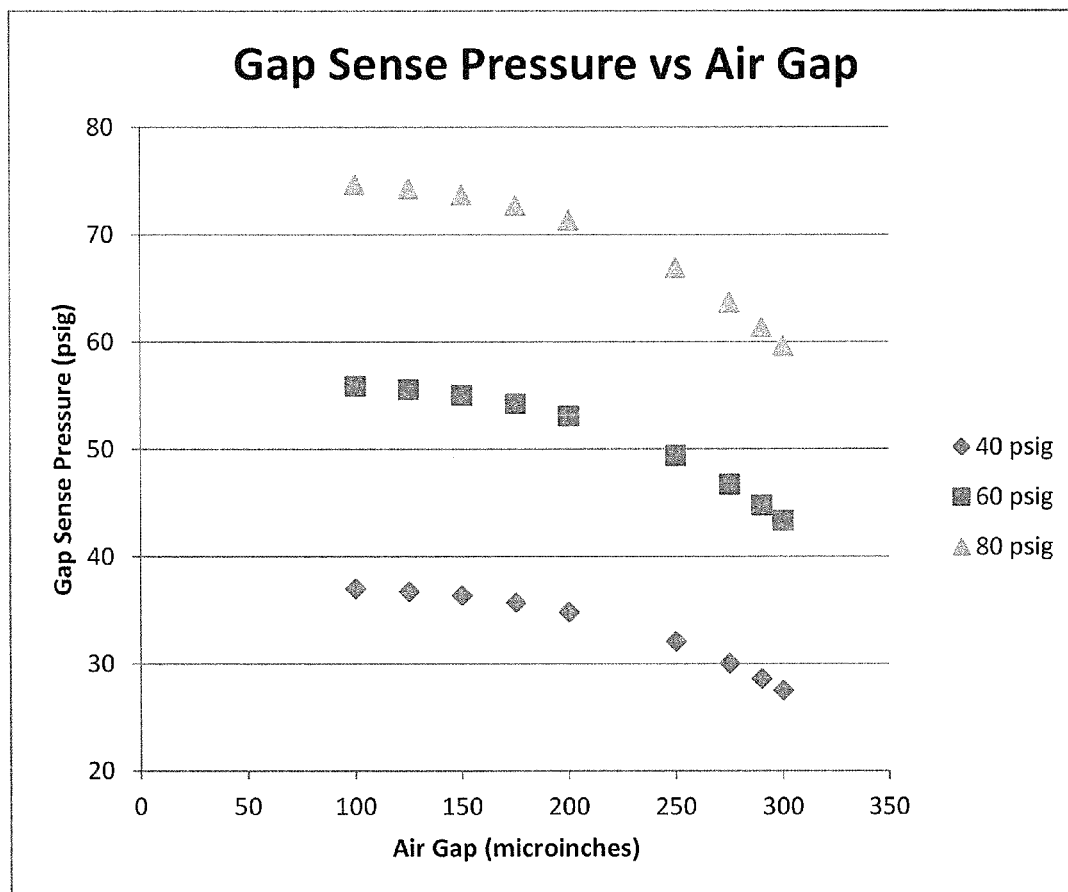
FIG. 7 is a graph showing a known relationship between gap sense pressure (psig) and gap width (microinches) for various applied pressures (psig) on a 2×4 inch flat rectangular air bearing that may be used in the inventive methods.
Figure 8:
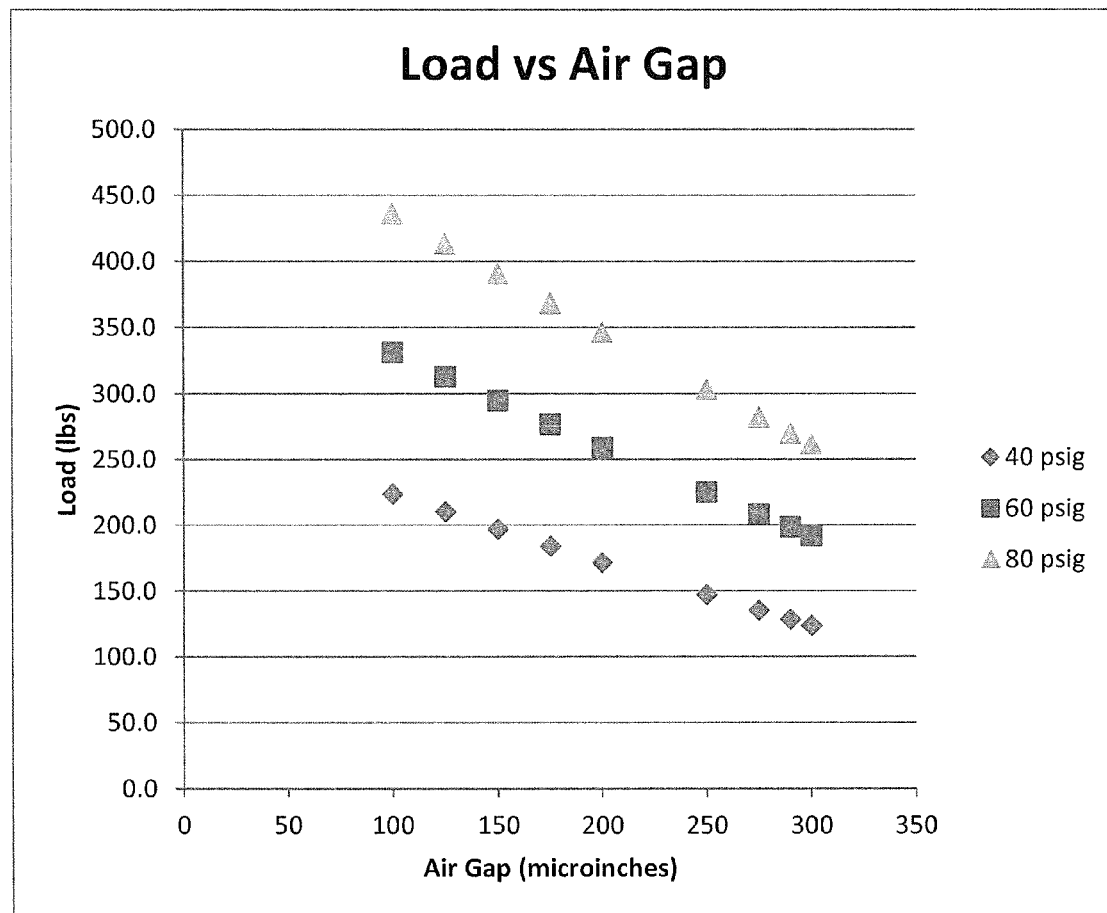
FIG. 8 is a graph showing a known relationship between load (pounds) and gap width (microinches) for various applied pressures (psig) on a 2×4 inch flat rectangular air bearing that may be used in the inventive methods.
Figure 9:
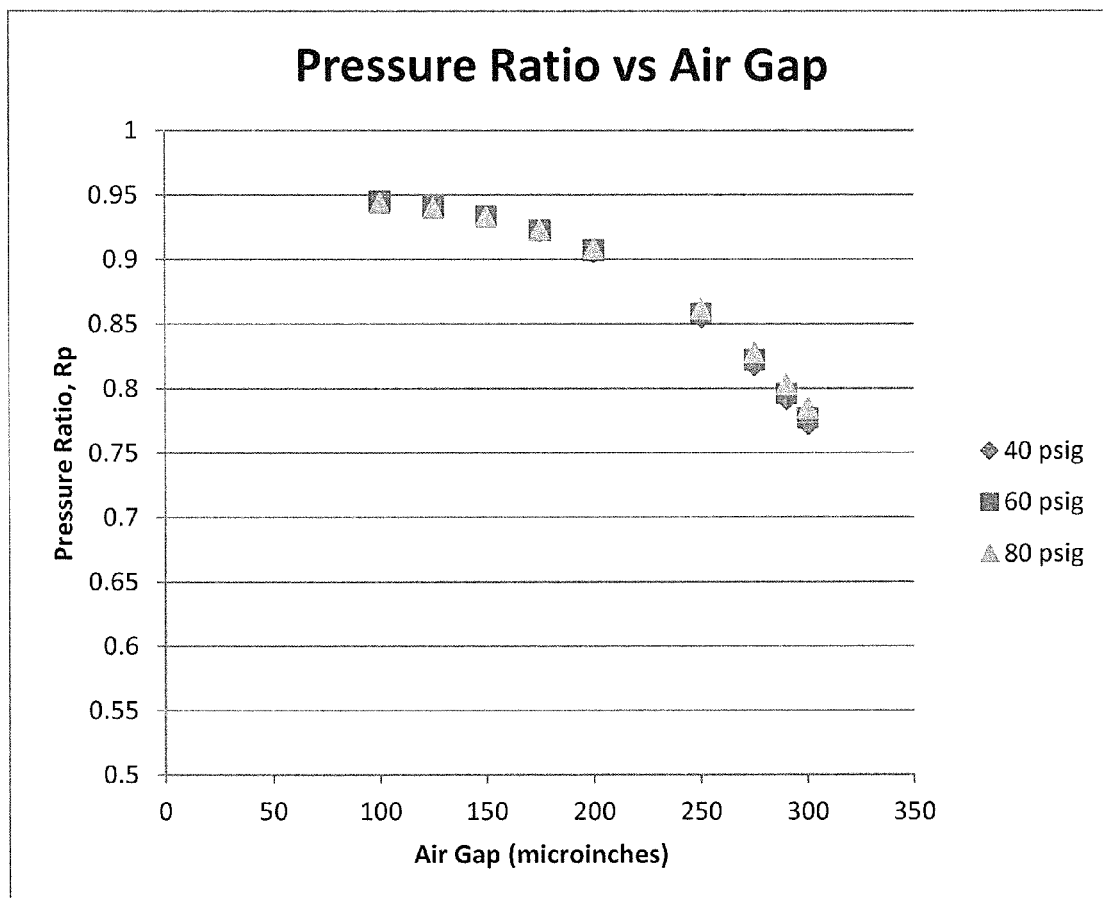
FIG. 9 is a graph showing a known relationship between pressure ratio (Rp) and gap width (microinches) for various applied pressures (psig) on a 2×4 inch flat rectangular air bearing that may be used in the inventive methods.
Figure 10:
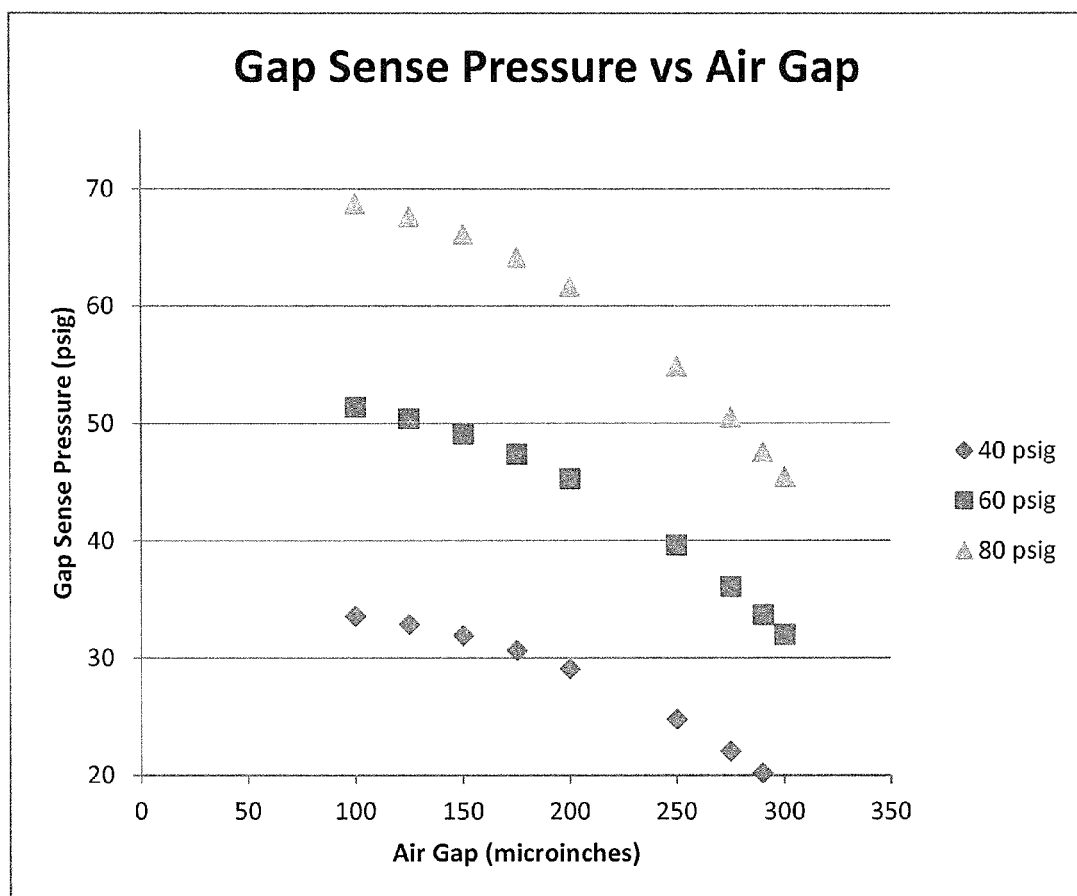
FIG. 10 is a graph showing a known relationship between gap sense pressure (psig) and gap width (microinches) for various applied pressures (psig) on a 2 inch diameter flat round air bearing that may be used in the inventive methods.
Figure 11:
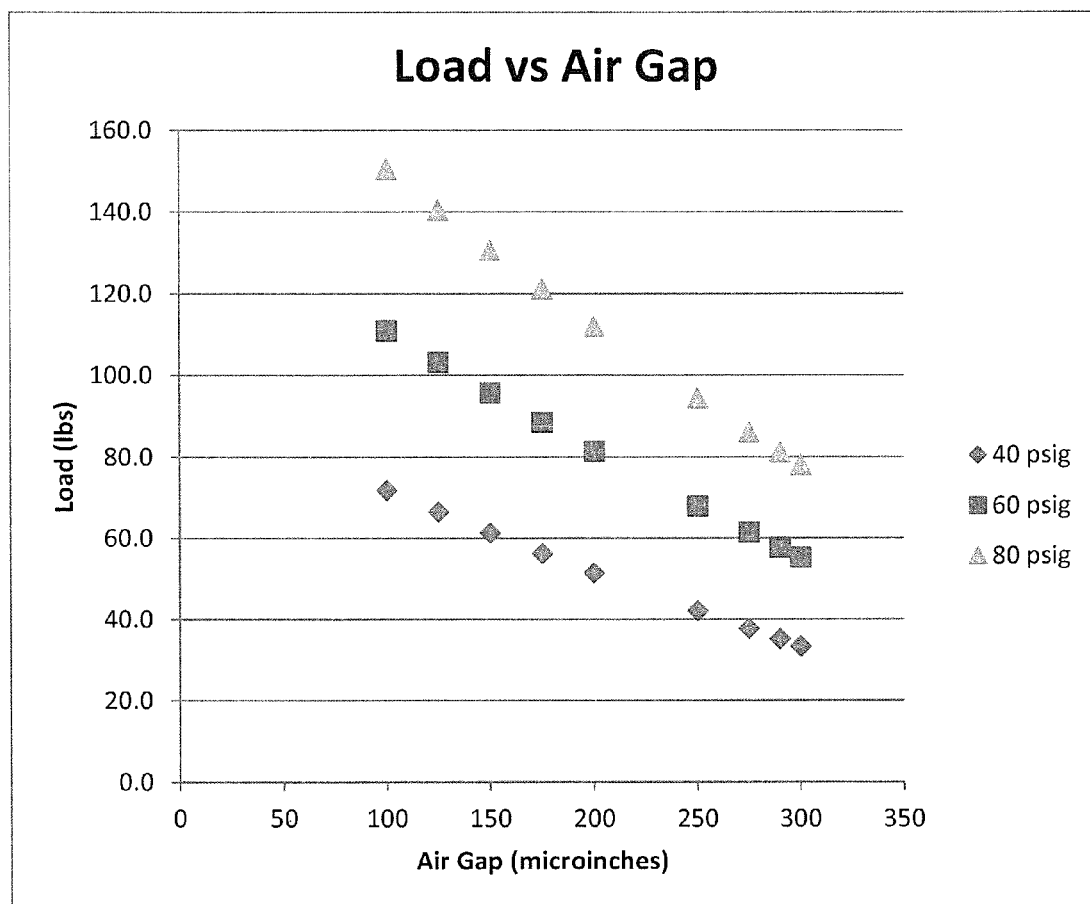
FIG. 11 is a graph showing a known relationship between load (pounds) and gap width (microinches) for various applied pressures (psig) on a 2 inch diameter flat round air bearing that may be used in the inventive methods.

FIG. 3b shows a method similar to that shown in FIG. 3a, whereby the measured gap distance (106), load applied (102) and sensed fluid pressure (104) are used to determine the ratio of absolute air film pressure to absolute input pressure (110), which is in turn used to determine a formula for calculating the gap distance for a given sensed pressure or applied pressure (112).

Any input pressure (102) pertinent to the bearing type and size can be utilized. The gap distance (106) can be measured by any means known in the art and will vary depending on the size and type of the bearing. The invention is advantageous in that it is not limited in any way by the type or size of the bearings.

The inventive method can be applied to all types of fluid film bearings, including, but not limited to: hydrodynamic, hydrostatic, aerodynamic, aerostatic, spherical, cylindrical, conical, orifice inlet, porous surface inlet as well as the porous surface aerostatic flat bearing shown in FIG. 1.

FIGS. 4-15, show various predetermined relationships between sensed pressure and gap distance, applied pressure and gap distance, and pressure ratio (Rp) and gap distance for several exemplary bearings that may be used in the invention. The graphs of FIGS. 4-15 were generated by way of a data table in which the input pressure, sensed pressure and gap distance were recorded for a rectangular 1×2 inch flat air bearing, 2×4 inch flat rectangular air bearing, 2 inch diameter flat round air bearing, and 4 inch round diameter air bearing at input pressures of 40, 60 and 80 psig. The measurements were used to calculate the pressure ratio, Rp.

It has been determined by the inventor that the ratio, Rp, of absolute air film pressure to absolute input pressure is a constant for a given air gap and air bearing:

$$Rp = (Pf + 14.7 \text{ psi})/(Ps + 14.7 \text{ psi})$$

where: Rp=Pressure Ratio; Pf=Film gage pressure; and Ps=Supply gage pressure to the bearing. This characteristic allows for interpolation of the air gap distance using supply pressures not known.

EXAMPLE

An air gap of 200 microinches is desired for a 2 inch diameter bearing and the supply pressure to the bearing is 70 psig.

By using the relationship above where Rp=(Pf+14.7 psi)/(Ps+14.7 psi), air gap may be determined in the following manner.

Figure 12:
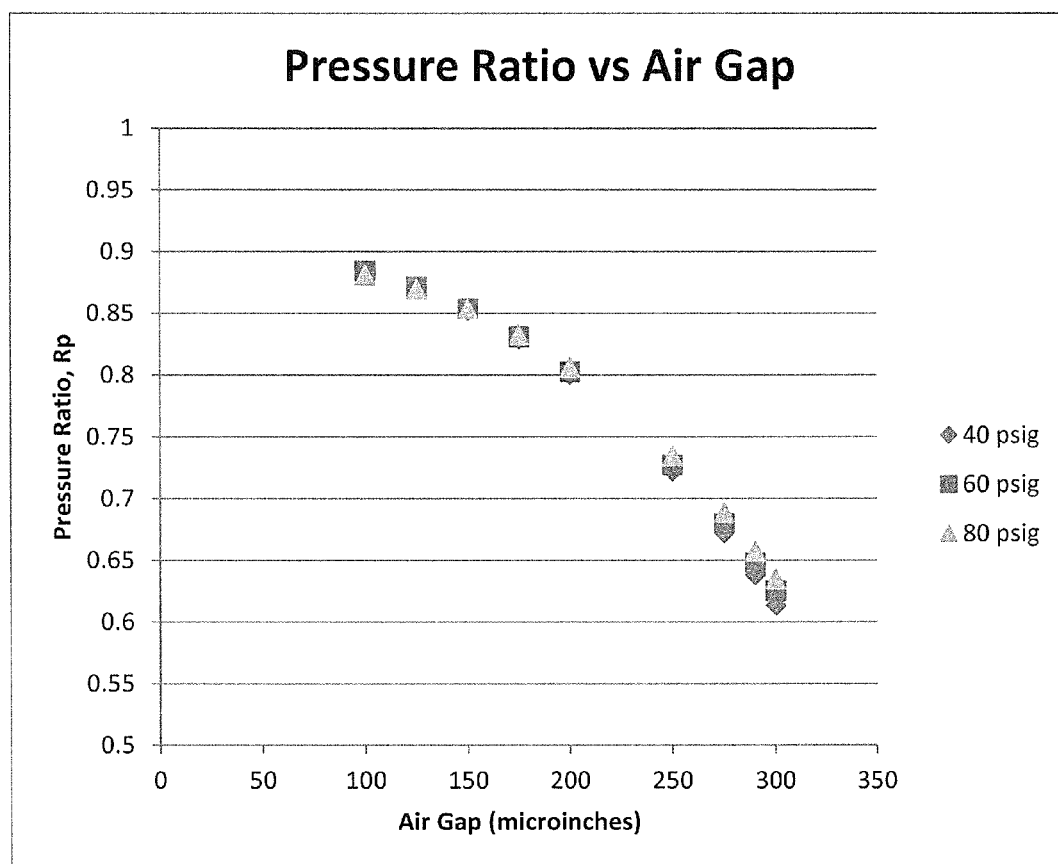
FIG. 12 is a graph showing a known relationship between pressure ratio (Rp) and gap width (microinches) for various applied pressures (psig) on a 2 inch diameter flat round air bearing that may be used in the inventive methods.
Figure 13:
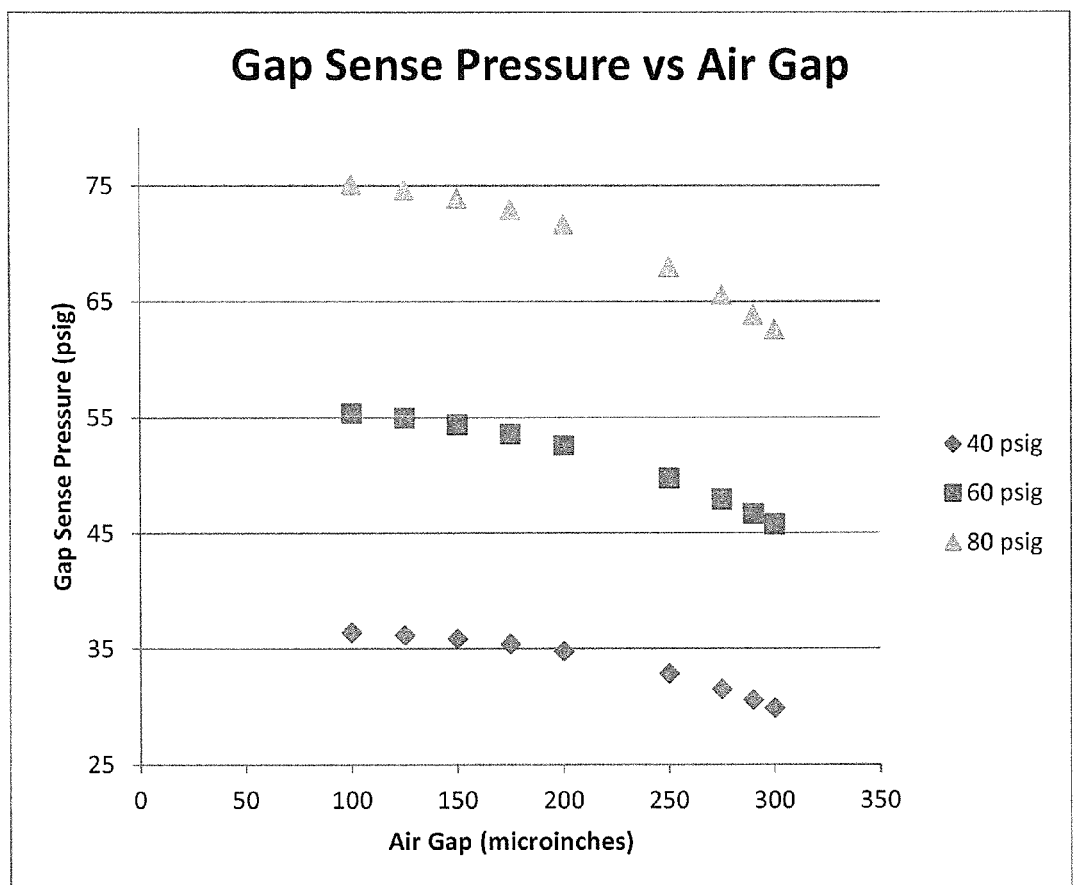
FIG. 13 is a graph showing a known relationship between gap sense pressure (psig) and gap width (microinches) for various applied pressures (psig) on a 4 inch diameter flat round air bearing that may be used in the inventive methods.
Figure 14:
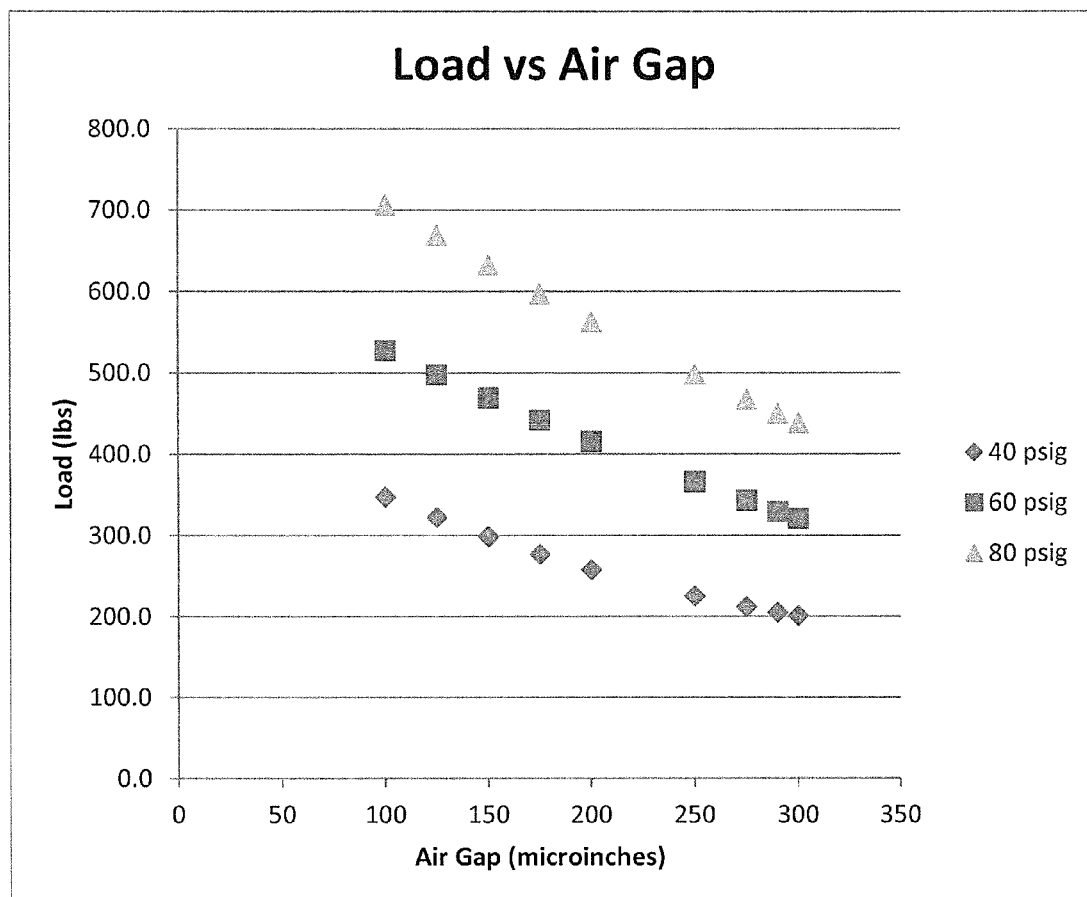
FIG. 14 is a graph showing a known relationship between load (pounds) and gap width (microinches) for various applied pressures (psig) on a 4 inch diameter flat round air bearing that may be used in the inventive methods.
Figure 15:
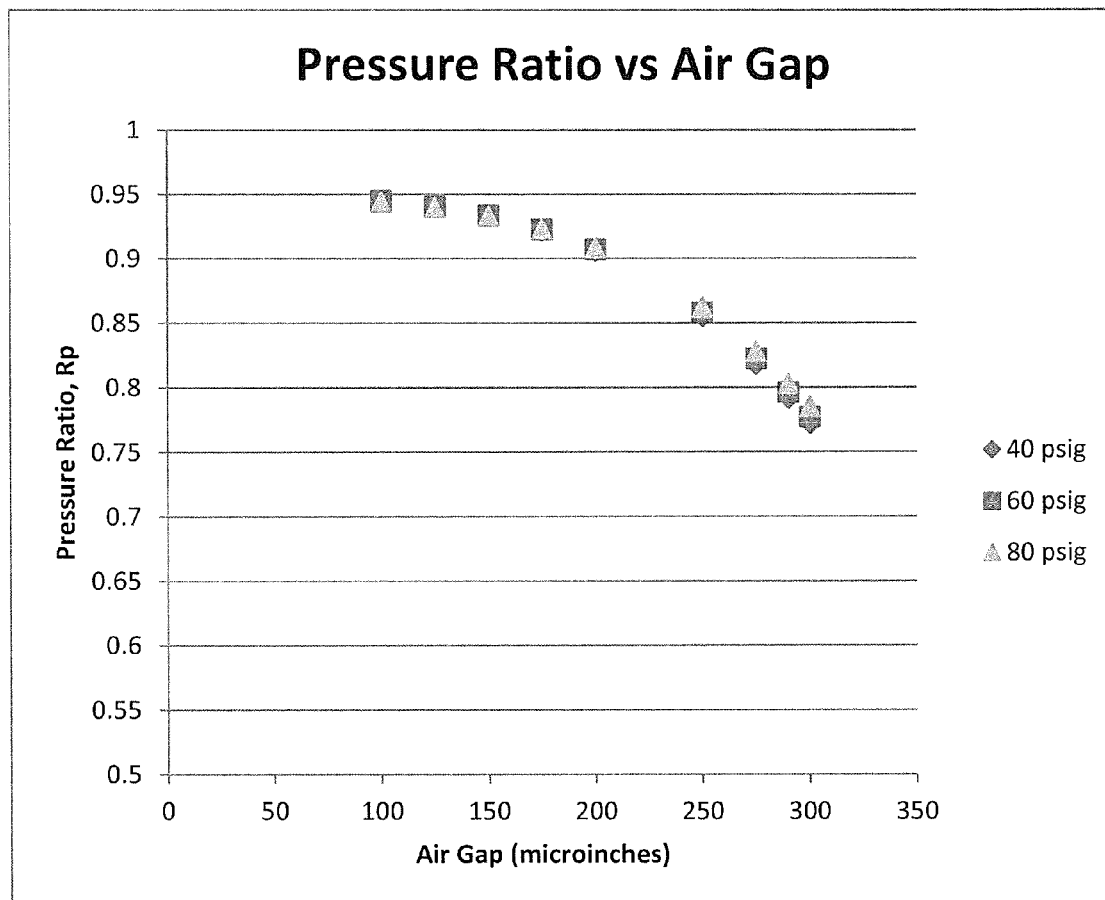
FIG. 15 is a graph showing a known relationship between pressure ratio (Rp) and gap width (microinches) for various applied pressures (psig) on a 4 inch diameter flat round air bearing that may be used in the inventive methods.

(1) Intersect the Pressure ratio curve of FIG. 12 at 200 microinches to find Rp at 0.8.
(2) 0.8=(Pf+14.7 psi)/(70+14.7 psi)
(3) Solve for Pf, Pf=53 psig.

Therefore, a 2 inch diameter bearing with 70 psig supply pressure will have a 200 microinch air gap when the film pressure measures 53 psig.

In this exemplary manner, the gap distance can be determined by way of the predetermined relationship between load applied, gap distance and sensed pressure.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Although the invention has been described with reference to a particular arrangement of parts, features and the like, these are not intended to exhaust all possible arrangements or features, and indeed many other modifications and variations will be ascertainable to those of skill in the art.

The following examples are presented to further illustrate and explain the present invention and should not be taken as limiting in any regard. Unless otherwise mentioned, all parts and percentages are by weight. All physical and mechanical measurements were conducted using industry standard test methods.

What is claimed is:

1. A method for adjusting a fluid gap in fluid film bearings comprising the steps of:
   - establishing a relationship between measurements of bearing load applied, fluid pressure and gap width for a known bearing having certain parameters;
   - applying a load to a bearing being adjusted, said adjusted bearing having the same parameters as the known bearing;
   - measuring fluid pressure of the fluid film in the adjusted bearing;
   - determining the fluid gap of the adjusted bearing using the established relationship between the bearing load applied versus gap and corresponding fluid pressure; and
   - adjusting the gap of the adjusted bearing to a desired width using the established relationship.

2. The method of claim 1, wherein the step of establishing a relationship between the measurements of bearing load applied, gap width and fluid pressure comprises
   - building a table of measurements of supply gage pressure, film gage pressure and gap distance; and
   - determining the ratio, Rp, of absolute air film pressure to absolute input pressure.

3. The method of claim 1, wherein the step of establishing a relationship between the measurements of bearing load applied, gap width and fluid pressure comprises using a formula relating the measurements of film gage pressure, supply gage pressure and gap width to determine film pressure at a desired gap width.

4. The method of claim 1, wherein the method is performed before final assembly of the bearing.

5. The method of claim 1, wherein the bearing is a hydrodynamic, hydrostatic, aerodynamic, aerostatic, spherical, cylindrical, conical, orifice inlet, porous surface inlet, or porous surface aerostatic.

6. The method of claim 1, wherein the fluid pressure is measured by a pressure sensor.

7. The method of claim 6, wherein the pressure sensor is connected to an inlet channel within the housing of the bearing, said channel leading from a surface of the fluid gap to an outer wall of said housing.

8. The method of claim 7, wherein the pressure sensor is detached after measuring the fluid pressure.

9. The method of claim 8, wherein the inlet channel is plugged after the pressure sensor is detached.

10. The method of claim 7, wherein the inlet channel is located near the center of the bearing housing.

11. The method of claim 6, wherein the pressure sensor is electronic.

12. The method of claim 6, wherein the pressure sensor is incorporated within the bearing housing.

13. The method of claim 12, wherein the pressure sensor is connected to an inlet channel leading from the sensor to a surface of the fluid gap.

14. The method of claim 1, wherein the method is performed after the bearing is in operation.

15. A method for adjusting a fluid gap in fluid film bearings comprising the steps of:
   (a) establishing a relationship between measurements of bearing load applied, fluid pressure and gap width for a known bearing having certain parameters;
   (b) applying a load to a bearing being adjusted, said adjusted bearing having the same parameters as the known bearing;
   (c) measuring fluid pressure of the fluid film in the adjusted bearing;
   (d) determining the fluid gap of the adjusted bearing using the established relationship between bearing load applied versus gap and corresponding fluid pressure;
   (e) adjusting the gap of the adjusted bearing towards a desired width using the established relationship; and
   (f) repeating steps (b)-(e) until the desired gap width is reached.

* * * * *